Aug. 19, 1969  D. L. HINKLE  3,462,179

SAFETY COUPLING OR CONNECTOR

Filed Oct. 16, 1967

INVENTOR
DONALD L. HINKLE

BY

ATTORNEY

United States Patent Office 3,462,179
Patented Aug. 19, 1969

3,462,179
SAFETY COUPLING OR CONNECTOR
Donald L. Hinkle, P.O. Box 2106,
Clarksburg, W. Va. 26301
Filed Oct. 16, 1967, Ser. No. 675,603
Int. Cl. F16d 1/00; F16c 11/00
U.S. Cl. 287—100          2 Claims

ABSTRACT OF THE DISCLOSURE

A coupling or connector for joining a pair of members together in a manner that permits pivotal movement between each member within certain limitations. One member terminates in a hook portion that readily encompasses a transverse element in the yoked end of a second member upon being rotated through an arc of the predetermined number of degrees. The members will be retained in engagement with one another as long as neither member moves through an arc of said predetermined number of degrees. This abstract is neither intended to define the invention of the application which, of course, is measured by the claims, nor is it intended to be limiting as to the scope of the invention in any way.

Background of the invention

The coupling or connector of the present invention is readily applicable to hoisting, pulling or anchoring equipment of a type that might be adapted to various kinds of equipment used in oil and gas well operations. In fact the subject matter of the present invention is easily adaptable to any type of industry, light or heavy, where a hoisting or lifting mechanism is employed or where a pair of members are pivotally connected together and can only be separated when one of said members moves, with respect to the other member, through an arc of a predetermined number of degrees.

The known prior art devices consisted of a yoked end member which receives therein the end of a second member and a pin or bolt is inserted through suitable apertures formed in the respective ends of said members for pivotally securing them together. Another form of prior art is typified by the use of a member terminating in a conventional hook while the coacting member is formed with a looped portion that fits over the hook end. The primary trouble or short comings of said prior art devices is that in one instance the members are readily susceptible of becoming separated from one another upon one of the members moving through an arc with respect to the other member or the difficulty often encountered in coupling or uncoupling the one member from the other.

Summary

The safety coupling or connector of the present invention is directed to a member that terminates in a segment or end portion having an aperture therein with a laterally extending slot or passage being formed in said end portion or segment and communicating with said aperture. The slot or passage is of such a configuration that it will readily receive the flat sides or faces of a bar member that is carried in the yoked end of another or second member so that said bar will be permitted to move into the aperture in the segment or end portion. An object of the invention is to provide a pivotal connection between a pair of coacting members one of which is formed with a hooked end portion and is capable of being moved through an arc of a predetermined number of degrees with respect to the other member to facilitate the coupling or uncoupling of said mmebers from one another. Another object is to permit pivotal movement within predescribed limitations between a pair of connected members wherein said members will be retained in engagement with one another against accidental separation.

Description of the preferred embodiments

Figure 1:
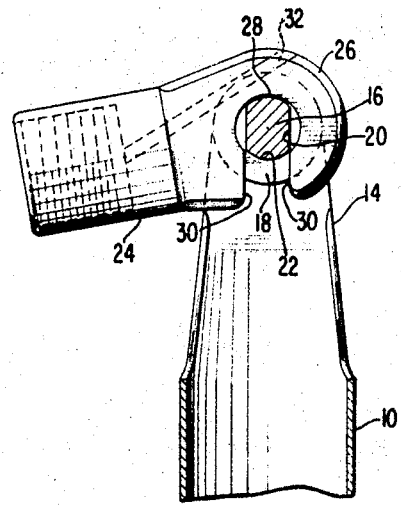
FIGURE 1 is a side elevational view of a coupling embodying the present invention with portions thereof being shown in section in the interest of clarity.

Referring to the drawing the safety coupling or connector comprises an elongated cylindrical member 10 which terminates in a yoked or bifurcated end having spaced parallel legs or segments 12 and 14. The yoked end of the member 10 is provided with a cylindrical cross or bail bar 16 that has its ends secured to the segments 12 and 14 adjacent their outer ends by any suitable means, such as welding. The cross or bail bar 16 has associated therewith a pair of wear plates 18 which are secured, such as by welding, to the innerfaces of the legs 12 and 14. The wear plates tend to strengthen the yoked end of the member 10 and also aid in the rentention of the cross bar within said yoked end portion. The cylindrical member 10 may be of solid construction throughout whereby it could act as a weight in the lowering of various pieces of equipment in a hoisting and lifting operation, such as in a gas or oil well. However, instead of being solid the cylindrical member may be in the form of a hollow tube that terminates in a yoked end portion and which may readily be utilized in lowering and positioning various pieces of equipment within a casing string of an oil or gas well operaton.

The cylindrical cross or bail bar 16 is formed with a pair of parallel flat sides or faces 20 which are parallel to the longitudinal axis of the cylindrical member 10. Thus the bail bar 16 is formed with two parallel flat sides or faces and two cylindrical or arcuate sides or faces 22 so that the diameter of the bar from one face 22 to the opposite arcuate face 22 is greater than the diameter from one flat face 20 to the other flat face.

Figure 2:
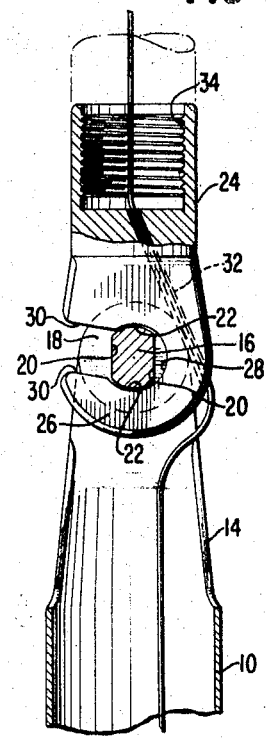
FIGURE 2 is an elevational view showing the coupling members in operative relation, portions being shown in section to more clearly illustrate the coupling relationship between said members.

The safety coupling or connector comprises a second member 24 of substantially cylindrical configuration which is formed with a reduced circular end portion 26 that has a central opening or hole 28, FIGURE 2. The end portion 26 is provided in one side portion thereof with a gate or passage that extends from the outer surface of the end portion to the central opening 28 so that the member 24 is provided with a hooked end portion. The gate or passage is defined by a pair of faces or segments 30 which are flat and arranged in spaced parallel relation to one another. The distance or spacing between said faces or segments 30 is slightly larger than the diameter of the cross bar 16 between the sides or faces 20 while the diameter of the opening 28 is slightly larger or greater than the diameter of the cross bar 16 between the arcuate faces 22. The longitudinal axis of the coupling member 24 tends to bisect the opening 28 but an examination of FIGURES 1 and 2 will clearly disclose that the median axis of the gate or passage, as defined by the segments or faces 30, is not normal to the longitudinal axis of the coupling member. Thus it is apparent that the gate lies in a plane that is less than 90 degrees with respect to the longitudinal axis of the coupling member 24 as illustrated in FIGURE 2.

In assembling or joining the members 10 and 24 of the coupling the member 24 must be rotated, in a counterclockwise direction when viewing FIGURES 1 and 2, until its longitudinal axis is disposed at an angle greater than 90 degrees with respect to the longitudinal axis of the member 10. In other words, the longitudinal axis of one member must be disposed in a plane approximately normal to the plane of the longitudinal axis of the other member such as shown in FIGURE 1. When the members are disposed in such angular relation with respect to one another the gate or passage in the member 24, as defined by the faces 30, is an alignment or registry with the faces 20 of the cross bar 16. Thus the hooked end portion 26 of the member 24 is then capable of being moved onto the bar 16 inasmuch as the spacing between the faces 30 is slightly larger than the diameter of the bar between the faces 20. The end portion 26 is moved onto the cross bar 16 until one of the arcuate faces 22 engages said end portion at which time the cross bar will be positioned within the opening 28 after which the member 24 is rotated in a clockwise direction from the position of FIGURE 1 to that of FIGURE 2 so that the arcuate faces 22 of the cross bar will engage the opening 28. With the coupling members 10 and 24 in the position as shown in FIGURE 2 wherein the longitudinal axis of one member is in alignment with the longitudinal axis of the other member the coupling cannot be separated as the spacing between the faces 30 of the gate is less than the diameter of the cross bar 16 between the arcuate faces 22. Thus the members are readily capable of pivotal movement with respect to one another but cannot become separated unless one member is rotated through an arc with respect to the other member of more than 90 degrees. As disclosed in FIGURE 1 the longitudinal axis of the member 10 has been rotated through an arc of approximately 100 degrees so that the two members may be separated or joined together as the case may be.

Figure 3:
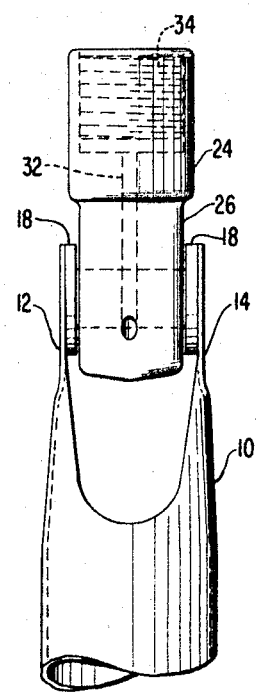
FIGURE 3 is a rear elevational view of the coupling shown in FIGURE 2.
Figure 4:
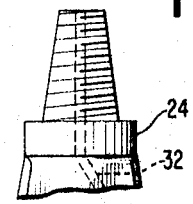
FIGURE 4 is an elevational view of a modification of a portion of one of the coupling members.

The hooked end portion 26 of the member 24 is preferably formed of a width or thickness approximating a distance between the wear plates 18 so as to restrict any lateral movement of one member with respect to the other coupling member. The member 24 is formed with a passage way 32 which permits the passage of an electric conduit or a wire line through the coupling member with the conduit or wire line then passing very readily through the member 10. The coupling member 24 may be formed with an internally threaded socket portion 34, as shown in FIGURES 1 through 3 for securing the threaded end of any suitable tool that might be used in the oil or gas well industry for lifting or hoisting equipment. In lieu of a threaded socket or a box the member 24 may be formed as a threaded pin such as shown in FIGURE 4.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:
1. A coupling comprising a pair of members, one of said members being of a cylindrical configuration which terminates in a reduced circular end portion, the cylindrical portion of said one of said members being threaded internally, said circular end portion having a central opening and a lateral opening merging into said central opening to define a hooked end for said circular end portion, the lateral opening in said hooked end being defined by a pair of flat segments wall arranged in spaced parallel relation to one another and being of a width equal to the thickness of said circular end portion, said other member being of elongated cylindrical configuration and terminating in a bifurcated end portion and having a bar mounted in the end thereof transverse of the longitudinal axis of said other member, said bar having a pair of parallel flat faces and a pair of opposed arcuate faces, said flat faces being smooth and uninterrupted throughout their entire area and being complementary to said flat segments of said circular end portion, said flat faces slideably engaging said flat segments upon the insertion of the circular end portion in said end of said second member to position said bar in said central opening, said members when in engagement having their longitudinal axis in alignment with one another with the median axis of the lateral opening in said first member being in a plane less than 90° to the portion of the longitudinal axis of said first member passing thru said internally threaded portion whereby said first member must be rotated with respect to the second member to a position wherein its longitudinal axis will be in a plane of more than 90° with respect to the longitudinal axis of the second member in order to remove the first member from the second member.

2. A coupling as set forth in claim 1 wherein said reduced circular end portion is formed with an internal passage.

References Cited
UNITED STATES PATENTS

| | | |
|---|---|---|
| 537,840 | 4/1895 | Maine. |
| 891,153 | 6/1908 | Dowse. |
| 2,497,337 | 2/1950 | Ackerman _ _ _ _ _ _ _ _ _ _ _ 16—172 |
| 2,892,648 | 6/1959 | Turner _ _ _ _ _ _ _ _ _ _ _ _ _ 287—100 |

CARL W. TOMLIN, Primary Examiner

A. V. KUNDRAT, Assistant Examiner

U.S. Cl. X.R.

16—172; 24—201